(12) United States Patent
Xie et al.

(10) Patent No.: US 9,019,298 B2
(45) Date of Patent: Apr. 28, 2015

(54) IMPORTANCE SAMPLING FOR HAIR SCATTERING

(71) Applicant: Pacific Data Images LLC, Redwood City, CA (US)

(72) Inventors: Feng Xie, Belmont, CA (US); Jiawei Ou, Hanover, NH (US)

(73) Assignee: Pacific Data Images LLC, Redwood City, CA (US)

( * ) Notice: Subject to any disclaimer, the term of this patent is extended or adjusted under 35 U.S.C. 154(b) by 248 days.

(21) Appl. No.: 13/743,775

(22) Filed: Jan. 17, 2013

(65) Prior Publication Data

US 2013/0215139 A1    Aug. 22, 2013

Related U.S. Application Data

(60) Provisional application No. 61/587,641, filed on Jan. 17, 2012, provisional application No. 61/666,554, filed on Jun. 29, 2012.

(51) Int. Cl.
*G06T 11/00* (2006.01)
*G06T 15/50* (2011.01)

(52) U.S. Cl.
CPC ............... *G06T 11/001* (2013.01); *G06T 15/50* (2013.01)

(58) Field of Classification Search
CPC ................................ G06T 15/15; G06T 15/50
USPC ......................................................... 345/595
See application file for complete search history.

(56) References Cited

PUBLICATIONS

Ren et al.: Interactive Hair Rendering Under Environment Lighting, ACM Transactions on Graphics (Jul. 2010).*
Marschner et al.: Light Scattering from Human Hair Fibers, ACM Transactions on Graphics vol. 22, No. 3 (Jul. 2003).*
Sadeghi et al., "An Artist Friendly Hair Shading System", ACM Transactions on Graphics, vol. 29, No. 4, Article 56, Jul. 2010, pp. 56:1-56: 10 pages.
Kajiya et al., "Rendering Fur with Three Dimensional Textures", Computer Graphics, vol. 23, No. 3, Jul. 31-Aug. 4, 1989, pp. 271-280.
Marschner et al., "Light Scattering from Human Hair Fibers", ACM Inc., 2003, pp. 780-791.

* cited by examiner

*Primary Examiner* — David Zarka
*Assistant Examiner* — Richard M Russell
(74) *Attorney, Agent, or Firm* — Morrison & Foerster LLP

(57) ABSTRACT

A technique for rendering an image of hair in a computer-generated scene is described. The scene includes a virtual light source and a hair virtual object comprising a material model. A hair shading function partly defining the material model is accessed. A set of random values is generated. The hair shading function is importance sampled by converting the set of random values into a set of light direction samples based on a Cauchy distribution. The probability density function of each converted light direction sample uses a Cauchy distribution. A light color value and a hair color value are computed for each light direction sample of the set of light direction samples. The light color values and the hair color values are weighted to determine a set of weighted values. A characteristic of a pixel representing part of the virtual object is determined based on the set of weighted values.

27 Claims, 9 Drawing Sheets

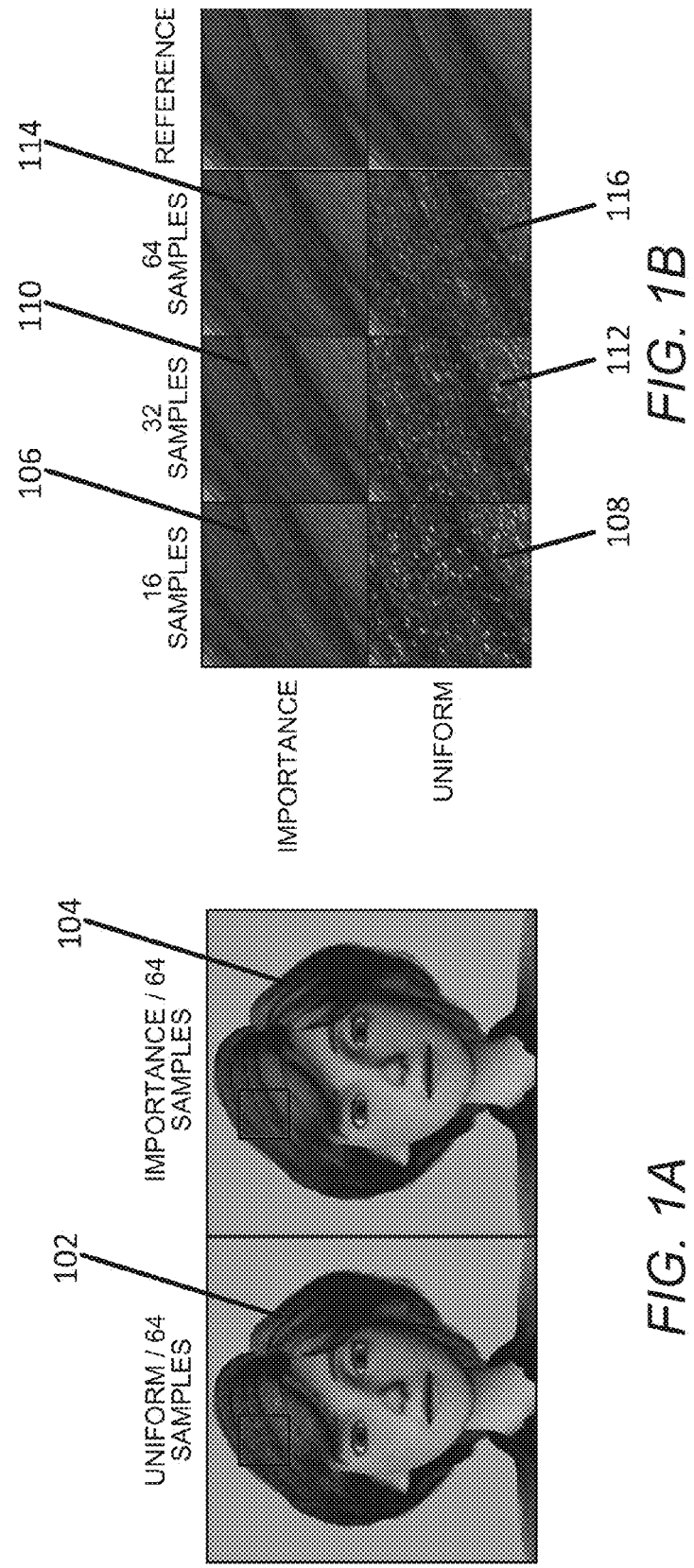

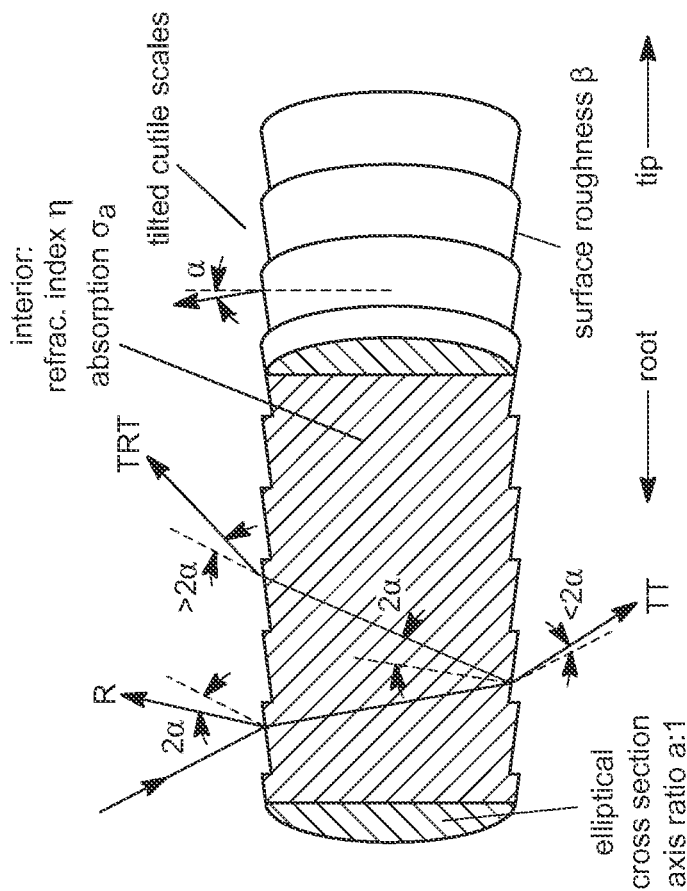
FIG. 3 —PRIOR ART—

Azimuthal lobes

Longitudinal lobes

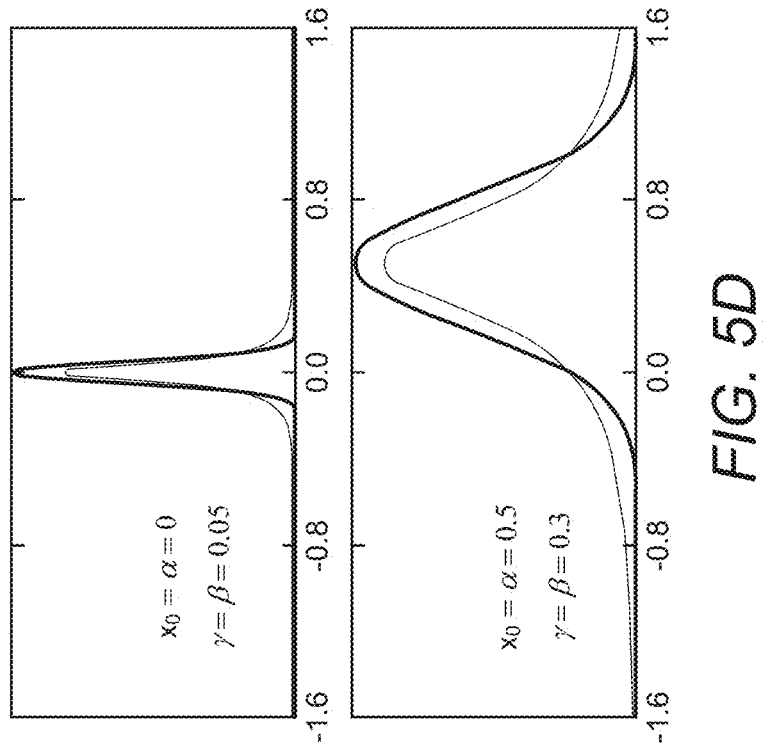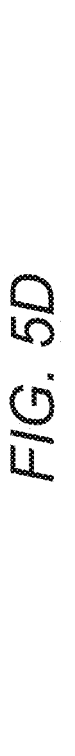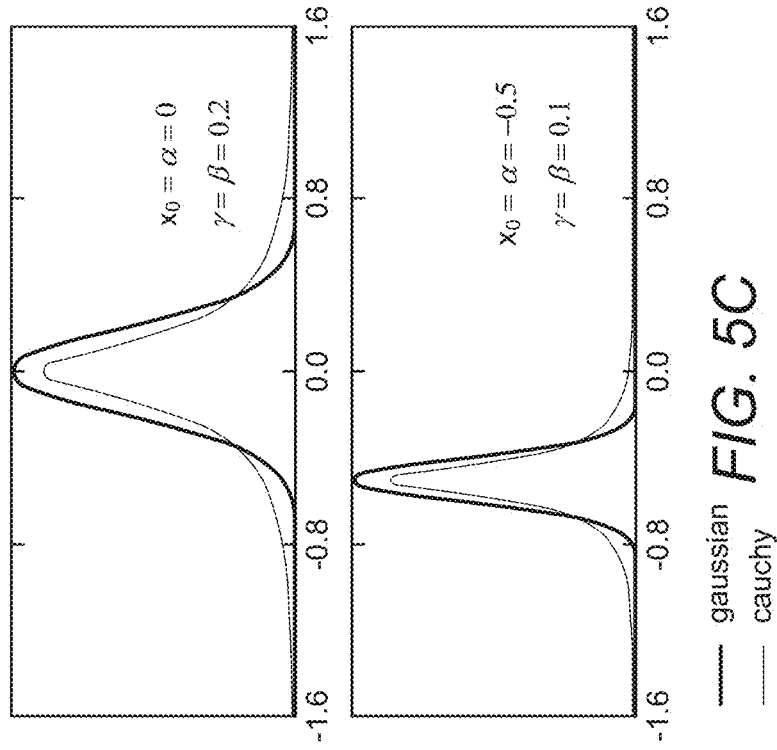

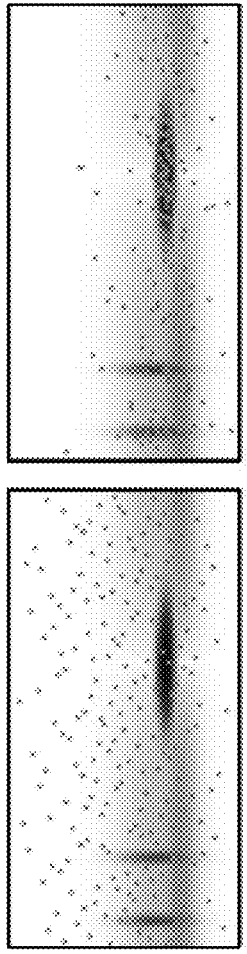
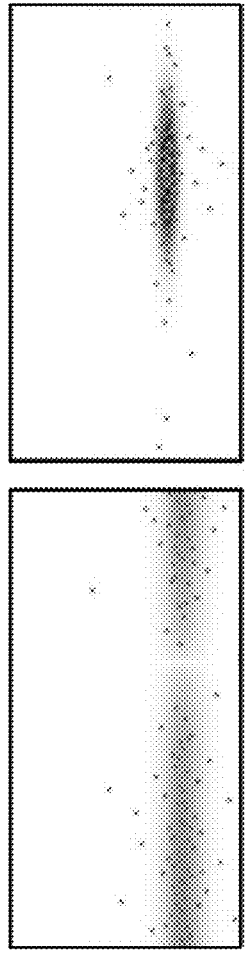
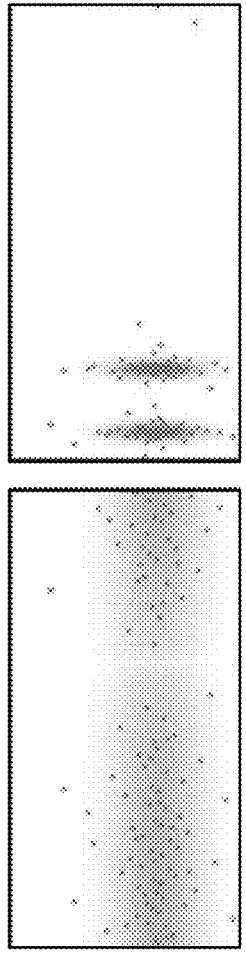
*FIG. 6A* Uniform Sampling
*FIG. 6B* Importance Sampling
*FIG. 6C* R Lobe
*FIG. 6D* TT Lobe
*FIG. 6E* TRT-g Lobe
*FIG. 6F* g Lobe

IMPORTANCE SAMPLING FOR HAIR SCATTERING

CROSS-REFERENCE TO RELATED APPLICATIONS

This application claims priority to U.S. Provisional Application No. 61/587,641 filed on Jan. 17, 2012 and U.S. Provisional Application No. 61/666,554 filed on Jun. 29, 2012, the entire contents of which are hereby incorporated by reference.

BACKGROUND

1. Field

The present disclosure relates generally to rendering technology and, more specifically, to importance sampling for hair scattering.

2. Related Art

Media productions have used increasingly complex algorithms in order to create more realistic images. Increased emphasis has been directed towards the display and animation of hair, reflecting the ubiquitous nature of hair as an element of human and animal characters.

While it is important to providing characters with a realistic appearance, high-quality hair rendering has been a particularly challenging feature. Early works employed hair modeled by computing light scattering using thin cylinders. See Kajiya, J. T., and Kay, T. L., Rendering Fur with Three Dimensional Textures, *Computer Graphics* (*Proceedings of SIGGRAPH* 89), pp. 271-280 (1989). Later works improved upon this model by incorporating internal path analysis of hair strands. See Marschner et al., Light Scattering from Human Hair Fibers, *ACM Transactions on Graphics* Vol 22, Issue 3, pp. 780-791 (July 2003). While models focusing on providing a bidirectional scattering distribution function (bsdf) for hair have been proposed, none provide an efficient method to importance sample the scattering function.

SUMMARY

A technique for rendering an image of hair in a computer-generated scene is described. The scene includes a virtual light source and a hair virtual object comprising a material model. A hair shading function partly defining the material model is accessed. A set of random values is generated. The hair shading function is importance sampled by converting the set of random values into a set of light direction samples based on a Cauchy distribution. The probability density function of each converted light direction sample uses a Cauchy distribution. A light color value and a hair color value are computed for each light direction sample of the set of light direction samples. The light color values and the hair color values are weighted to determine a set of weighted values. A characteristic of a pixel representing part of the virtual object is determined based on the set of weighted values.

BRIEF DESCRIPTION OF THE DRAWINGS

The present application can be best understood by reference to the following description taken in conjunction with the accompanying figures, in which like parts may be referred to by like numerals.

FIG. 1A illustrates an exemplary result of a stratified uniform sampling technique.

FIG. 1B illustrates an exemplary comparison for various numbers of samples between hair rendered using importance sampling and hair rendered using uniform sampling.

FIG. 3 illustrates a hair in relation to a hair shading model.

FIG. 5A illustrates a exemplary Gaussian distribution and an exemplary Cauchy distribution.

FIG. 5B illustrates an exemplary Gaussian distribution and an exemplary Cauchy distribution with offsets of 0 and widths of 0.05.

FIG. 5C illustrates an exemplary Gaussian distribution and an exemplary Cauchy distribution with offsets of −0.5 and widths of 0.1.

FIG. 5D illustrates an exemplary Gaussian distribution and an exemplary Cauchy distribution with offsets of 0.5 and widths of 0.3.

FIG. 6A illustrates an example of samples for uniform sampling.

FIG. 6B illustrates an exemplary concentration of samples in regions of high importance.

FIG. 6C illustrates an exemplary sample distribution for importance sampling for the R lobe.

FIG. 6D illustrates an exemplary sample distribution for importance sampling for the TT lobe.

FIG. 6E illustrates an exemplary sample distribution for importance sampling for the TRT-g lobe.

FIG. 6F illustrates an exemplary sample distribution for importance sampling for the g lobe.

DETAILED DESCRIPTION

Figure 2A:
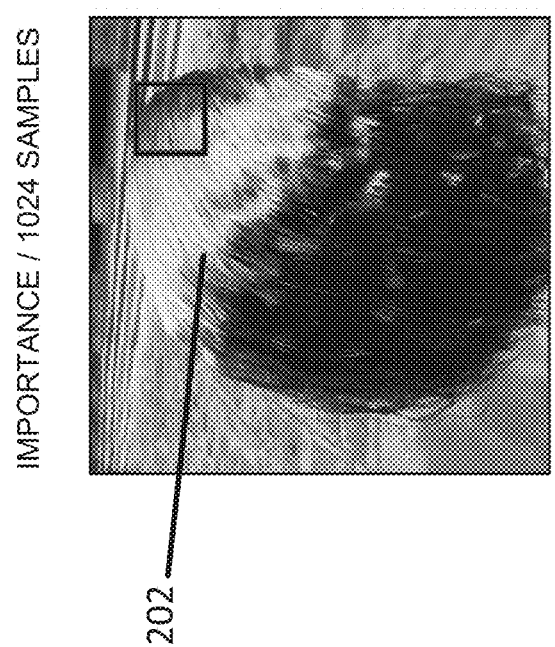
FIG. 2A illustrates exemplary shiny blonde hair under environmental lighting rendered with global illumination using path tracing.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Some disclosed examples are directed to a technique for importance sampling the bidirectional scattering distribution function (bsdf) of hair, based on a multilobe hair scattering model. FIG. 1 illustrates a comparison between an image of a character with hair rendered using path tracing by uniform sampling the bsdf of the character's hair and by importance sampling the bsdf of the character's hair.

With regard to hair 102 in FIG. 1A, a stratified uniform sampling technique is used that results in many visible artifacts when the process is limited to 64 samples. With regard to hair 104, an importance sampling technique results in a visibly higher quality image, while using the same number of samples. The hair 104 in the image of FIG. 1A is generated using a computer-generated scene. The scene consists of a plurality of virtual objects that are used for the purpose of rendering images or video. The objects of the scene may be visible in the rendered images, such as characters, or may be used for other purposes, such as lighting. The objects that are intended to be visible in the rendered images have material properties associated with them. The material properties define the characteristics of materials. For example, material properties of an object may define the texture of the object, the transparency of the object, or the reflectivity of the object. Generally, objects and scenes are generated by a computer and are stored in computer memory. Various light sources may be used to virtually illuminate the scene. For example, a point light, a directional light, an area light, a dome light, or combinations of these light sources may be used.

FIG. 1B provides a more detailed comparison for various numbers of samples between hair rendered using importance sampling and hair rendered using uniform sampling. Hairs 106, 110, and 114 were rendered using importance sampling. Hairs 108, 112, and 116 were rendered using uniform sampling. Specifically, hairs 106 and 108 were both rendered using 16 samples. However, hair 106, which was rendered using importance sampling, has much less noisy artifacts than hair 108, which was rendered using uniform sampling. Similarly, visual comparisons between hairs 110 and 112 and between hairs 114 and 116 reveal that hairs 110 and 114, which were rendered using importance sampling, provide much better visual results than hairs 112 and 116, which were rendered using uniform sampling.

1. Overview

Importance sampling is a useful technique where a mathematical expectation with respect to a target distribution is approximated by a weighted average of random draws from another distribution. Importance sampling reduces the number of samples required to generate high-quality images using Monte Carlo-based integration methods. In particular, importance sampling is used to efficiently reduce variance in Monte Carlo integration by drawing samples from a distribution with a probability distribution function (pdf) that is proportional to the function being integrated. Without importance sampling, generating hair images with certain characteristics, such as shiny hair, may require a large number of samples before the Monte Carlo integration converges and becomes stable. Computing such a large number of samples sufficient to cause convergence significantly increases the computational cost of generating integrated lighting on hair.

The rendering equation is a high dimensional integral where many integrands don't have a closed form anti-derivative. Monte Carlo integration is a numerical solution whose complexity is independent of the dimension of the integral, as such it is a viable solution for solving the rendering integral equation. The basic Monte Carlo convergence rate is $O(n^{0.5})$. As a result, using uniform sampling would take a lot of samples (e.g., thousands to millions depending on the variance) to converge. The key to the success of Monte Carlo based algorithm is the sampling strategy because importance sampling can significantly reduce the number of samples required for convergence.

As the bar for physical realism keeps increasing in cinematic effects, the rendering technology for visual effects and feature animation has increased its reliance on Monte Carlo integration. In particular, Monte Carlo integration is used to compute the effect of light source with area or infinite light source with environment mapping illuminating on complex materials using physically based bsdf models and measured bsdf models. Monte Carlo integration is also used to compute indirect illumination that results from light rays reflecting, transmitting, or scattering as they hit any surface in a computer-generated scene. The surfaces may include, for example, metal, wood, hair, water, and other surfaces.

Monte Carlo-based lighting techniques have greatly improved the workflow efficiency of lighting artists in visual effects and animation studios. Image-based lighting and large area lights define the basic tones of the lighting in the scene. Ray tracing, irradiance caching, or point-based global illumination techniques may be used to compute the indirect lighting effect as light bounces around in the scene. However, until now, these Monte Carlo-based lighting techniques are not conventionally applied to rendering hair because the hair bsdf is complex and there was no known effective technique to importance sample the hair bsdf. Without importance sampling, many samples would be required for Monte Carlo-based lighting techniques on hair to converge. These many required samples translate to a very high computation cost because the cost of computation is linearly dependent on the number of samples to be evaluated. Therefore, lighting artists were constrained to use point lights on hair.

Virtual objects in a cinematic or animation scene coexist together in one space at the same time, and are therefore under the same lighting condition. In order to make the lighting on a character's hair, skin, and clothing very similar, artists must frequently spend a lot of time manually setting up many point lights to approximate the effect of an Image Based Lighting (IBL) based lighting rig on the skin and clothing of the character. Thus, while the Monte Carlo-based lighting technique has brought much improvement into the workflow of lighting artists, lighting hair remained a challenging and time-consuming process.

However, effective importance sampling of hair scattering model fundamentally changes this process. With hair importance sampling, the same light setup of a scene that is being used on simple surfaces, such as skin and clothing, can be applied to the hair in the scene. This effectively removes the need to place many simple point lights and significantly reduces the time required to light a character with hair, though such simple point lights may continue to be used.

Physically-based hair shading models have narrow peaks in their specular lobes, especially for shiny hair. See, e.g., Sadeghi et al., *An Artist Friendly Hair Shading System, ACM Transactions on Graphics* 29 (2010). These narrow peaks cause severe noise when used in Monte Carlo-based rendering techniques. Importance sampling offers a means to reduce the variance by concentrating samples in regions with significant contribution to the illumination integral. Efficiently importance sampling a hair scattering function provides quality images with a reduction in the need for computing resources.

The importance sampling techniques described in detail below generally apply to rendering technology that uses, for example, area light sources, environment light sources, indirect lighting (reflection, refraction, scattering), and other lighting effects that are computed using Monte Carlo-based techniques, such as path tracing.

Figure 2B:
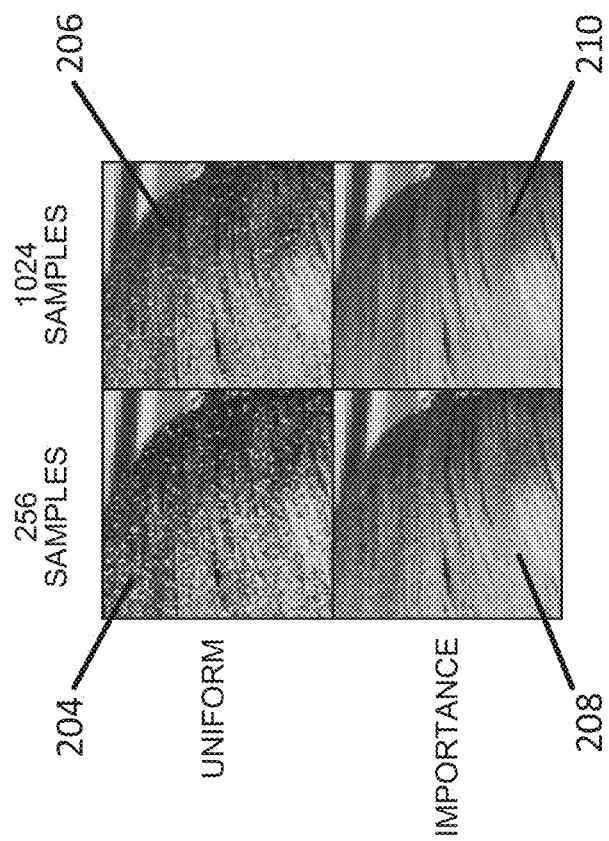
FIG. 2B illustrates an exemplary portion of shiny blonde hair rendered using both stratified uniform sampling and importance sampling.

FIG. 2 illustrates a comparison between stratified uniform sampling and importance sampling methods. FIG. 2A illustrates shiny blonde hair 202 under environmental lighting rendered with global illumination using path tracing. The hair in FIG. 2A is rendered using 1024 samples generated using the importance sampling techniques described in detail below. For comparison purposes, FIG. 2B illustrates a portion of the same hair, rendered using both stratified uniform sampling and importance sampling. The portion of the hair is magnified to more clearly illustrate the benefits of the importance sampling technique. In particular, hair 204 was rendered using 256 samples generated using stratified uniform sampling. As illustrated, many artifacts are visible in the rendered image. Increasing the number of samples reduces the number of artifacts. Hair 206 was rendered using 1,024 samples generated using stratified uniform sampling. Hair 206 has fewer visible artifacts than hair 204 because of the increased number of samples. However, hair 206 still contains a significant number of visible artifacts.

In contrast, hair 208 was rendered using 256 samples generated using the importance sampling techniques described in detail below. Hair 208 has significantly less artifacts than hair 204 and hair 206. Importantly, hair 208, which uses 256 samples, is more realistic and visually aesthetically pleasing than even hair 206, which uses 1,024 samples. Further improvement is seen in hair 210, which was rendered using 1,024 samples generated using the importance sampling techniques described in detail below. As evidenced by FIG. 2, importance sampling produces noticeably better quality rendered hair using fewer samples.

2. Hair Shading Function

High-quality Monte Carlo rendering benefits from the ability to importance sample realistic bsdf models. A hair shading function is now described.

TABLE 1, below, summarizes the notation used for the convenience of reader.

TABLE 1

,below, summarizes the notation used for the convenience of reader.

| Symbol | Description |
|---|---|
| $S(\theta_i, \phi_i, \theta_r, \phi_r)$ | hair bsdf |
| $M_R, M_{TT}, M_{TRT}$ | longitudinal scattering functions |
| $N_R, N_{TT}, N_{TRT-g}, N_g$ | azimuthal scattering functions |
| $\omega_i$ | incoming direction |
| $\omega_r$ | reflected direction |
| u | hair direction, pointing from the root to the tip |
| v, w | axes of the normal plane, orthogonal to u |
| $\theta_i, \theta_r$ | inclination of $\omega_i$ and $\omega_r$ with regard to the normal plane where 0° is perpendicular to u, 90° is u, and −90° is −u |
| $\phi_i, \phi_r$ | azimuthal angles of $\omega_i$ and $\omega_r$ in the normal plane where v is 0° and w is 90° |
| $\phi$ | relative azimuthal angle, $\phi_r - \phi_i$ |
| $\theta_d$ | longitudinal difference angle $\theta_d = (\theta_r - \theta_i)/2$ |
| $\theta_h$ | longitudinal half angle $\theta_h = (\theta_r + \theta_i)/2$ |

In one hair shading model, the scattering functions $S(\theta_i, \phi_i, \theta_r, \phi_r)$, of hair fibers are decomposed into four individual components: reflection (R), refractive transmission (TT), secondary reflection without glint (TRT-g), and glint (g).

FIG. 3 illustrates a hair in relation to the hair shading model, reproduced from Marschner et al., Light Scattering from Human Hair Fibers, *ACM Transactions on Graphics* Vol 22, Issue 3, pp. 780-791 (July 2003). R represents light that reflects off the outer surface of the hair, also known as primary reflection. TT represents light that has been transmitted through the hair. Specifically, TT represents light that is refracted as it enters the hair, travels through it, and then is refracted again as it exits the hair. TRT represents light that has been reflected off the inner surface of the hair, also known as secondary reflection. TRT represents light that is refracted when entering the outer hair surface, reflected by the inner surface, and then refracted again exiting the hair surface. β represents the roughness of the hair and α represents the angle of the highlight shift.

FIG. 4 illustrates a hair scattering function and its four primary components. In the illustration, u represents the direction of the hair, pointing from the root to the tip. $\theta_i$ represents the angle of inclination between the incoming light and the hair. R represents light that reflects off the outer surface of the hair, also known as primary reflection. TT represents light that has been transmitted through the hair. Specifically, TT represents light that is refracted as it enters the hair, travels through it, and then is refracted again as it exits the hair. TRT represents light that has been reflected off the inner surface of the hair, also known as secondary reflection. TRT represents light that is refracted when entering the outer hair surface, reflected by the inner surface, and then refracted again exiting the hair surface.

Each component is represented as a separate lobe and further factored as the product of a longitudinal term M and an azimuthal term N. The scattering model for hair is described as follows:

$$S(\theta_i, \phi_i, \theta_r, \phi_r) = I_R M_R(\theta_h) N_R \cos^2/\theta_d + I_{TT} M_{TT}(\theta_h) N_{TT}(\phi) \cos^2/\theta_d + I_{TRT} M_{TRT}(\theta_h) N_{TRT-g}(\phi) \cos^2/\theta_d + I_{TRT} M_{TRT}(\theta_h) I_g N_g(\phi) \cos^2/\theta_d$$

In this equation, $I_R$, $I_{TT}$, and $I_{TRT}$ are the color intensities of the corresponding lobe. $I_g$ is the additional color intensity of the glint lobe.

Figure 4B:
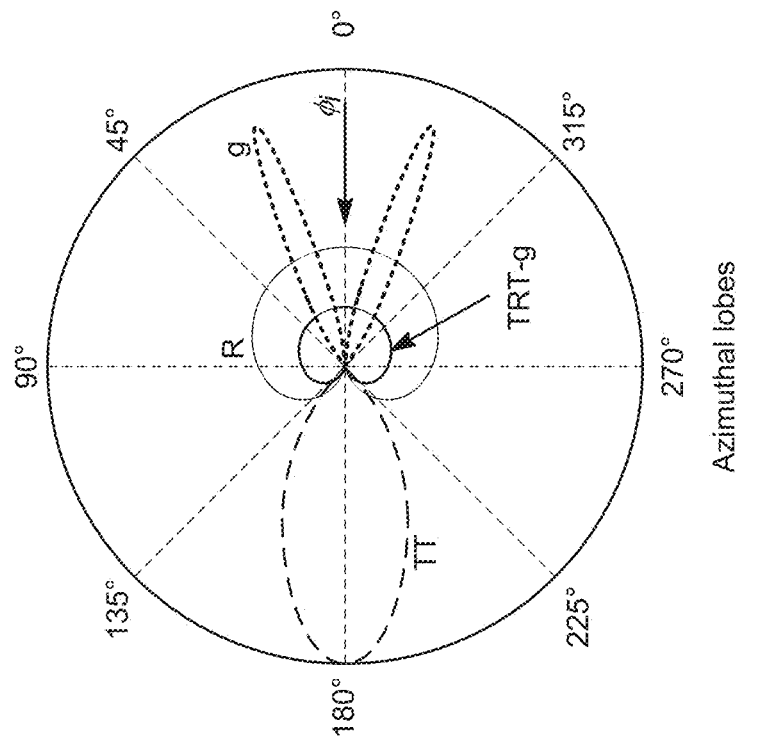
FIG. 4B illustrates the azimuthal lobes of an exemplary shading function.
Figure 4A:
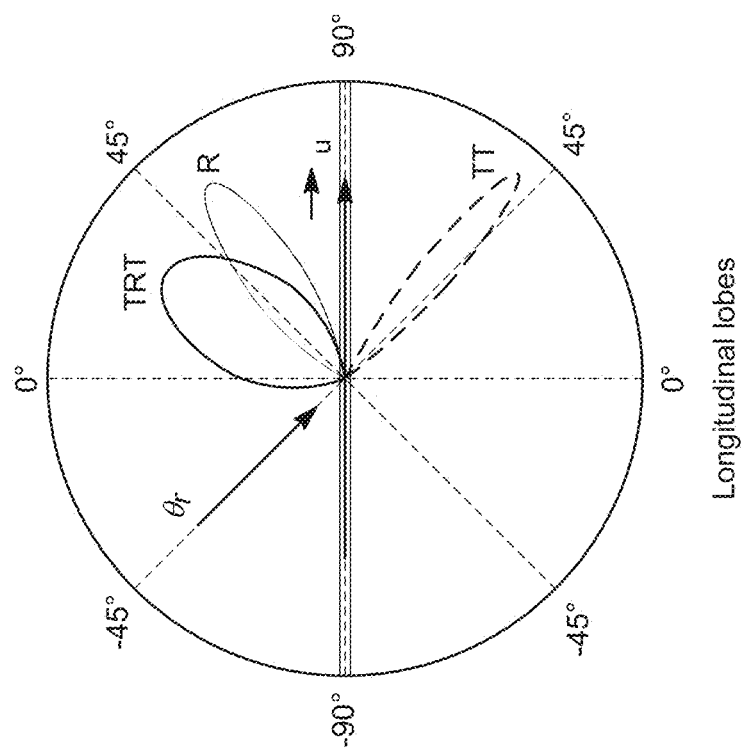
FIG. 4A illustrates the longitudinal lobes of an exemplary shading function.

FIG. 4A illustrates the longitudinal lobes of the shading function: reflection $M_R$, refractive transmission $M_{TT}$, and secondary reflection $M_{TRT}$.

$M_R$, $M_{TT}$, and $M_{TRT}$ model the longitudinal variation of each lobe, and each has the same form. $M_R$, $M_{TT}$, and $M_{TRT}$ are Gaussian functions of the longitudinal half angle $\theta_h$, as follows:

$$M_R = g(\beta_R^2, \alpha_R, \theta_h)$$

$$M_{TT} = g(\beta_{TT}^2, \alpha_{TT}, \theta_{TT})$$

$$M_{TRT} = g(\beta_{TRT}^2, \alpha_{TRT}, \theta_{TRT})$$

$\beta_R$, $\beta_{TT}$, and $\beta_{TRT}$ are the widths of the corresponding Gaussian functions and $\alpha_R$, $\alpha_{TT}$, $\alpha_{TRT}$ are the means of the corresponding Gaussian functions. From the user control perspective, α controls the highlight shift of each lobe. β controls the roughness or shininess of the hair. Using the notation of TABLE 1, $$g(\beta^2, \alpha, \theta_h) = \exp\left[-\frac{(\theta_h - \alpha)^2}{2\beta^2}\right]$$

In some examples, one or more of these components may be ignored or not used. For example, in one embodiment only the longitudinal term $M_R$ may be used, with the remaining longitudinal terms not being considered. As a more specific example, for rendering very shiny black hair, only the longitudinal term $M_R$ may be used, and the remaining longitudinal terms may be discarded for having zero weight.

FIG. 4B illustrates the azimuthal lobes of the shading function: reflection $N_R$, refractive transmission $N_{TT}$, secondary reflection without glint $N_{TRT-g}$, and glint $N_g$. Glint represents the lighting effect caused by the caustic light path inside hair strands.

$N_R$, $N_{TT}$, $N_{TRT-g}$, and $N_g$ model the azimuthal variation of each lobe. These azimuthal terms are functions of the relative azimuthal angle $\phi = \phi_r - \phi_i$, and are defined as:

$$N_R = \cos(\phi/2)$$

$$N_{TT} = g(\gamma_{TT}^2, \pi - \phi)$$

$$N_{TRT-g} = \cos(\phi/2)$$

$$N_g = g(\gamma_h^2, |\phi| - \phi_g)$$

$\gamma_{TT}$ is a user controllable azimuthal width for $N_{TT}$. $N_g$ has two Gaussian functions with widths $\gamma_g$ that are symmetric about the axis $\phi=0$. $\phi_g$ is the half angle between the peaks of the two Gaussian functions.

In some examples, one or more of these components may be ignored or not used. For example, in one embodiment only the azimuthal term $N_R$ may be used, with the remaining azimuthal terms not being considered. As a more specific example, for rendering very shiny black hair, only the azimuthal term $N_R$ may be used, and the remaining azimuthal terms may be discarded, or have zero weight.

3. Importance Sampling

Frequently, it is not feasible to solve for the integral of a given function using analytical techniques. An alternative is to use Monte Carlo integration. To efficiently reduce variance in Monte Carlo integration, a system may be configured to draw samples from an alternative distribution. The alternative distribution should have a pdf that is proportional to the given function. In the context of hair rendering, the system should be configured to sample $\omega_i$ such that $p(\omega_i) \propto S(\theta_i, \phi_i, \theta_r, \phi_r)$.

The hair bsdf $S(\theta_i, \phi_i, \theta_r, \phi_r)$ consists of four distinct lobes, or components. Each component is a product of a longitudinal term and an azimuthal term. Because the longitudinal and azimuthal term of each lobe depend on separate variables (i.e., $\theta_i$ and $\phi_i$), they can be sampled separately, and they can be converted into the sampled direction $\omega_i$. The pdf of the sample $\omega_i$ is a product of the longitudinal pdf and the azimuthal pdf:

$$p(\omega_i) = p(\theta_i) p(\phi_i)$$

Inverse cumulative distribution function (cdf) techniques are the primary techniques for deriving analytic importance sampling functions. The hair shading function $S(\theta_i, \phi_i, \theta_r, \phi_r)$ uses Gaussian functions to model the variation in longitudinal and azimuthal scattering. As a result, the system needs to draw samples proportional to a Gaussian distribution in order to derive an efficient sampling algorithm. However, determining a sampling algorithm for a Gaussian distribution is non-trivial because the Gaussian does not have a closed-form antiderivative. Thus, it may not be possible to use the inverse cdf technique directly to derive importance sampling functions for hair. Alternatively, numerical approximations for the pdf and cdf of the Gaussian may be used. However, these numerical approximations may require the evaluation of error functions or Taylor series, which are computationally expensive.

Drawing samples from a pdf that has a similar shape to the Gaussian function and has a closed-form antiderivative overcomes this limitation. The Cauchy distribution is a bell-shaped probability distribution function that approximates the bell-shaped Gaussian function. The Cauchy distribution is defined as:

$$f(\gamma, x - x_0) = \frac{1}{\pi}\left[\frac{\gamma}{(x - x_0)^2 + \gamma^2}\right]$$

Similar to the Gaussian, the Cauchy distribution is a bell-shaped function with offset $x_0$ and width $\gamma$. Unlike the Gaussian, the Cauchy distribution has an analytic antiderivative:

$$P(x) = \frac{1}{\pi}\tan^{-1}\left(\frac{x - x_0}{\gamma}\right)$$

Using this antiderivative, a sampling algorithm can be derived using an inverse cdf technique.

Another benefit of using the Cauchy distribution is that the offset of a Gaussian distribution can be directly used as the offset of the Cauchy distribution. Similarly, the width of the Gaussian distribution can be directly used as the width of the Cauchy distribution. Alternatively, the offset and/or width of the Cauchy distribution may be based on, but not equal to, the Gaussian distribution. Because Cauchy distributions have wider tails than Gaussian distributions, using the Cauchy distribution to approximate the Gaussian in importance sampling will not increase variance. Thus, the Cauchy distribution that approximates the Gaussian may be used to derive the sampling method for each lobe.

As an example, FIG. 5 illustrates Cauchy distributions and Gaussian distributions for various widths and offsets, normalized in the domain $[-\pi/2, \pi/2]$. In each of FIGS. 5A, 5B, 5C, and 5D, the same widths and offsets have been used to plot a Cauchy distribution and a Gaussian distribution. As can be seen graphically, the Cauchy distributions are a good approximation of the Gaussian distributions. FIG. 5A illustrates a Gaussian distribution 502 and a Cauchy distribution 504, both of which are bell-shaped. Gaussian 502 and Cauchy 504 both have an offset of 0 and a width of 0.2. FIG. 5B illustrates a Gaussian distribution 506 and a Cauchy distribution 508. Both distributions have an offset of 0 and a width of 0.05. Note that even with such a narrow width the Cauchy 508 distribution has a wider tail than the Gaussian distribution 506. FIG. 5C illustrates a Gaussian distribution 510 and a Cauchy distribution 512. Both distributions have an offset of -0.5 and a width of 0.1. Note that the same offset value causes both distributions to have the same offset between 0 and the position of the center of the peak of the two functions. FIG. 5D illustrates a Gaussian distribution 514 and a Cauchy distribution 516. Both distributions have an offset of 0.5 and a width of 0.3. As in the rest of FIG. 5, the Cauchy distribution 516 has a wider tail than the Gaussian distribution 514 that it approximates.

We now turn to sampling the terms described in the hair scattering function above. The three longitudinal terms $M_R$, $M_{TT}$, and $M_{TRT}$ have the same form. Accordingly, the process for sampling each of the three terms is similar. This process is described using generic symbols M, $\beta$, and $\alpha$. In this example, the $1/\cos^2(\theta_d)$ term will be ignored to reduce the complexity of calculations, as M accounts for most of the variation in the longitudinal terms. The sampling functions for incoming inclination $\theta_i$ are determined by substituting the Gaussian functions in the M terms with the corresponding Cauchy distributions.

Given a uniform random variable $\xi$ in $[0,1)$, we draw a sample of $\theta_i$ from the following pdf:

$$p(\theta_i) \propto \left[\frac{\beta}{\left(\frac{\theta_i + \theta_r}{2} - \alpha\right)^2 + \beta^2}\right]\frac{1}{\cos\theta_i}$$

Normalization produces:

$$\int_{-\frac{\pi}{2}}^{\frac{\pi}{2}} c\left[\frac{\beta}{\left(\frac{\theta_i + \theta_r}{2} - \alpha\right)^2 + \beta^2}\right]\frac{1}{\cos\theta_i}\cos\theta_i d\theta_i = 2c\tan^{-1}\left(\frac{\theta_i - \alpha}{\beta}\right)\Big|_{-\pi/2+\theta_r}^{\pi/2+\theta_r}$$

$$= 1$$

Therefore, $$c = \frac{1}{2(A - B)},$$

where $$A = \tan^{-1}\left(\frac{\frac{\pi/2 + \theta_r}{2} - \alpha}{\beta}\right) \text{ and } B = \tan^{-1}\left(\frac{\frac{-\pi/2 + \theta_r}{2} - \alpha}{\beta}\right).$$

The pdf of $\theta_i$ is:

$$p(\theta_i) = \frac{1}{2\cos\theta_i(A-B)} \frac{\beta}{\left(\frac{\theta_i + \theta_r}{2} - \alpha\right)^2 + \beta^2}$$

The cdf can be computed by integrating the pdf, as follows:

$$P(\theta_i) = \int_{-\frac{\pi}{2}}^{\theta_i} c\left[\frac{\beta}{\left(\frac{\theta_i' + \theta_r}{2} - \alpha\right)^2 + \beta^2}\right]\frac{1}{\cos\theta_i'}\cos\theta_i' d\theta_i'$$

$$= \frac{\tan-1\left(\frac{\frac{\theta_i + \theta_r}{2} - \alpha}{\beta}\right) - B}{A - B}$$

Thus, by inverting the cdf, given a random variable $\xi$ uniformly drawn from the range $[0,1)$, $\theta_i$ may be sampled as $\theta_i = 2\beta\tan(\xi(A-B)+B)+2\alpha-\theta_r$. This is how $\theta_i$ can be sampled.

The pdf for the azimuthal terms can also be computed. All the azimuthal terms are functions of relative azimuthal angle $\phi = \phi_r - \phi_i$. $\phi$ is sampled. $\phi_i = \phi_r - \phi$ is then computed. The pdf of $\phi$ is the same as the pdf of $\phi_i$ because $p(\phi_i) = p(\phi)|d\phi_i/d\phi|^{-1} = p(\phi)$.

As discussed above, $N_R$ models the azimuthal variation of the reflection lobe. Given a uniform random variable $\xi$ in $[0,1)$, we draw a sample of $\phi$ from the pdf $p(\phi) \propto N_R = \cos(\phi/2)$.

Normalization provides:

$$\int_{-\pi}^{\pi} c\cos\frac{\phi}{2} d\phi = c\int_{-\frac{\pi}{2}}^{\frac{\pi}{2}} 2\cos x dx$$

$$= 2c\sin x\Big|_{-\frac{\pi}{2}}^{\frac{\pi}{2}}$$

$$= 4c$$

$$= 1$$

Therefore, $c = 1/4$. The pdf of $\phi$ is $$p(\phi) = \frac{1}{4}\cos\frac{\phi}{2}.$$

The cdf can be computed by integrating the pdf:

$$\int_{-\pi}^{\phi} \frac{1}{4}\cos\frac{\phi'}{2} d\phi' = \frac{1}{2}\sin x\Big|_{-\frac{\pi}{2}}^{\frac{\phi}{2}} = \frac{1}{2}\left(\sin\frac{\phi}{2} + 1\right)$$

By inverting the cdf, given a uniform random variable $\xi$ drawn from the range $[0,1)$, $\phi$ may be sampled as $\phi = 2\sin^{-1}(2\xi-1)$. Using this equation, $\phi_i = \phi_r - \phi$ can be computed. This is how $\phi_i$ can be sampled.

As discussed above, $N_{TT}$ models the azimuthal variation of the refractive transition lobe and $N_{TT} = g(\gamma_{TT}^2, \pi-\phi)$, a Gaussian that is positive in the range $[0,2\pi)$. The sampling function for $N_{TT}$ is derived as follows, using the pdf:

$$p(\phi) \propto \frac{\gamma_{TT}}{(\phi-\pi)^2 + \gamma_{TT}^2}$$

Normalization gives:

$$\int_0^{2\pi} c\left[\frac{\gamma_{TT}}{(\phi-\pi)^2 + \gamma_{TT}^2}\right] d\phi = c\left[\tan^{-1}\left(\frac{\phi-\pi}{\gamma_{TT}}\right)\right]\Big|_0^{2\pi} = 1.$$

Therefore, $$c = \frac{1}{c_{TT}}$$

where $C_{TT} = 2\tan^{-1}(\pi/\gamma_{TT})$. The pdf of $\phi$ can then be computed as $$p(\phi) = \frac{1}{c_{TT}}\left[\frac{\gamma_{TT}}{(\phi-\pi)^2 + \gamma_{TT}^2}\right].$$

The cdf can be computed as:

$$\int_0^{\phi} c\left[\frac{\gamma_{TT}}{(\phi'-\pi)^2 + \gamma_{TT}^2}\right] d\phi' = \frac{1}{C_{TT}}\left[\tan^{-1}\left(\frac{\phi'-\pi}{\gamma_{TT}}\right)\right]\Big|_0^{\phi}$$

$$= \frac{\tan^{-1}\left(\frac{\phi-\pi}{\gamma_{TT}}\right)}{C_{TT}} + \frac{1}{2}$$

Inverting the cdf, and given a uniform random variable $\xi$ drawn from the range $[0,1)$, $\phi$ may be sampled as:

$$\phi = \gamma_{TT}\tan\left[C_{TT}\left(\xi - \frac{1}{2}\right)\right] + \pi$$

$\phi_i = \phi_r - \phi$ can then be computed. The azimuthal $$pdfp(\phi_i) = p(\phi) = \frac{1}{c_{TT}}\left[\frac{\gamma_{TT}}{(\phi-\pi)^2 + \gamma_{TT}^2}\right].$$

$N_{TRT-g}$ may be approximated as $\cos(\phi/2)$. Because the form of $N_{TRT-g}$ is the same as $N_R$, the same approach used to sample $N_R$ may be used to sample $N_{TRT-g}$.

$N_g$ models the azimuthal variation of the glint lobe, and is defined as two Gaussian functions symmetric about the $\phi=0$ axis. Glint models the lighting effect caused by the caustic light path inside hair strands.

Given a uniform random variable $\xi$ drawn from the range $[0,1)$, $\phi$ may be sampled from the pdf:

$$p(\phi) \propto \frac{\gamma_g}{(|\phi| - \phi_g)^2 + \gamma_g^2}$$

$\xi$ may be used to pick a half of the lobe and remap the random variable $\xi_2$ back to $[0,1)$. In the example where $$\xi < \frac{1}{2},$$

$\phi$ is set as positive and a $\xi \leftarrow 2\xi$ mapping is used. In the example where $$\xi \geq \frac{1}{2},$$

$\phi$ is set as negative and a $\xi \leftarrow 2(1-\xi)$ mapping is used. $\phi$ may then be sampled in the domain $[0, \pi/2)$. Normalization provides:

$$\int_0^{\pi/2} c\left[\frac{\gamma_g}{(|\phi|-\phi_g)^2+\gamma_g^2}\right]d\phi = c\left[\tan^{-1}\left(\frac{\phi-\phi_g}{\gamma_g}\right)\right]\bigg|_0^{\pi/2} = 1$$

Therefore, $$c = \frac{1}{C_g - D_g}$$

where $$C_g = \tan^{-1}\left(\frac{\pi/2 - \phi_g}{\gamma_g}\right) \text{ and } D_g = \tan^{-1}\left(\frac{-\phi_g}{\gamma_g}\right).$$

The pdf of $\phi$ can be computed as:

$$p(\phi) = \frac{1}{C_g - D_g}\left[\frac{\gamma_g}{(\phi-\phi_g)^2+\gamma_g^2}\right]$$

The cdf can be computed by integrating the pdf:

$$\int_0^\phi c\left[\frac{\gamma_g}{(\phi'-\phi_g)^2+\gamma_g^2}\right] = \frac{1}{C_g - D_g}\left[\tan^{-1}\left(\frac{\phi'-\phi_g}{\gamma_g}\right)\right]\bigg|_0^\phi$$

$$= \frac{\tan^{-1}\left(\frac{\phi-\phi_g}{\gamma_g}\right) - D_g}{C_g - D_g}$$

Given a uniform random variable $\xi$ drawn from the range $[0,1)$, $\phi$ may be sampled as:

$$\phi = \gamma_g \tan(\xi(C_g - D_g) + D_g) + \phi_g$$

Accordingly, $\phi_i = \phi_r \pm \phi$ can be computed. The pdf of $\phi_i$ can be computed, while taking into account the remapping of the random variable:

$$p(\phi_i) = \frac{1}{2}p(|\phi|) = \frac{1}{2(C_g - D_g)}\left[\frac{\gamma_g}{(|\phi_r - \phi_i| - \phi_g)^2 + \gamma_g^2}\right]$$

4. Selecting which Lobe to Sample Based on Energy Estimates of Lobes

The complete bsdf may be sampled by distributing samples to each lobe. One technique to achieve this is to uniformly select lobes. A preferred technique is to use an energy-based lobe selection technique in order to better match the energy distribution of the bsdf. Using this technique, for each sample, a lobe is selected based on the energy of the lobes. More specifically, for each sample, a lobe is selected with a probability proportional to an estimate of the energy of each lobe. The energy of each lobe may be estimated as the product of the integrals of the longitudinal and azimuthal terms, which are:

$$E_R = 4\sqrt{2\pi}\beta_R I_R$$

$$E_{TT} = 2\pi\beta_{TT}\gamma_{TT}I_{TT}$$

$$E_{TRT\text{-}g} = 4\sqrt{2\pi}\beta_{TRT}I_{TRT}$$

$$E_g = 4\pi\beta_{TRT}\gamma_g I_{TRT}I_g$$

The estimated energies may be computed using the Gaussian integral in the domain $[-\infty, \infty]$, as above, or in the domain $[-\pi/2, \pi/2]$. The latter produces a more accurate answer, but both are acceptable as estimates of the energies. By computing the estimate using the integral over domain $[-\infty, \infty]$, the error of our approximation is less than 1% for $\beta<30°$ and $|\alpha|<20°$. For $\beta<20°$ and $|\alpha|<10°$, the approximation error is less than 0.003%.

5. Implementation Notes $A_R$, $A_{TT}$, $A_{TRT}$, $B_R$, $B_{TT}$, $B_{TRT}$, $C_{TT}$, $C_g$, and $D_g$ in the sampling functions are constants for all the samples of the same gather point and reflective direction $\omega_r$. The constants can be computed once and the cost can be amortized over all the samples.

The sampling function can result in degenerate samples that need to be disregarded. Specifically, the longitudinal pdf has a singularity when $\theta_L$ approaches $-\pi/2$ or $\pi/2$. The sample evaluation may become numerically unstable at these grazing angles. One technique for avoiding this instability is to discard the sample if the angle between $\omega_i$ and u or $-$u is smaller than a determined value, such as $10^{-5}$. Because this threshold results in less than 0.01% samples being discarded, its effect on the final render is negligible.

6. Sample Distribution

FIG. 6 illustrates an exemplary sample distribution difference between stratified uniform sampling and importance sampling of hair bsdf. FIG. 6A illustrates an example of samples for uniform sampling. In comparison, FIG. 6B uses the above described importance sampling method to concentrate samples in regions of high importance. FIGS. 6C-F illustrate the sample distribution of the importance sampling of each individual lobe.

7. Importance Sampling Examples

Various techniques may be employed for rendering a computer-generated scene. Two examples of these techniques are direct lighting and path tracing. Direct light is light that travels directly from a light source to a virtual object, and then to the observer, such as a virtual camera placed in a scene. Indirect light is light that does not travel directly from a light source to the object, but rather takes an indirect path. For example, indirect light may be light that reaches the observed object after being reflected by another object. In the direct lighting technique, only direct light is considered for lighting the observed object. In the path tracing technique, indirect light may also be considered for lighting the observed object. Importance sampling hair using a Cauchy distribution is applicable to the various lighting techniques, including direct lighting and path tracing.

Figure 7:
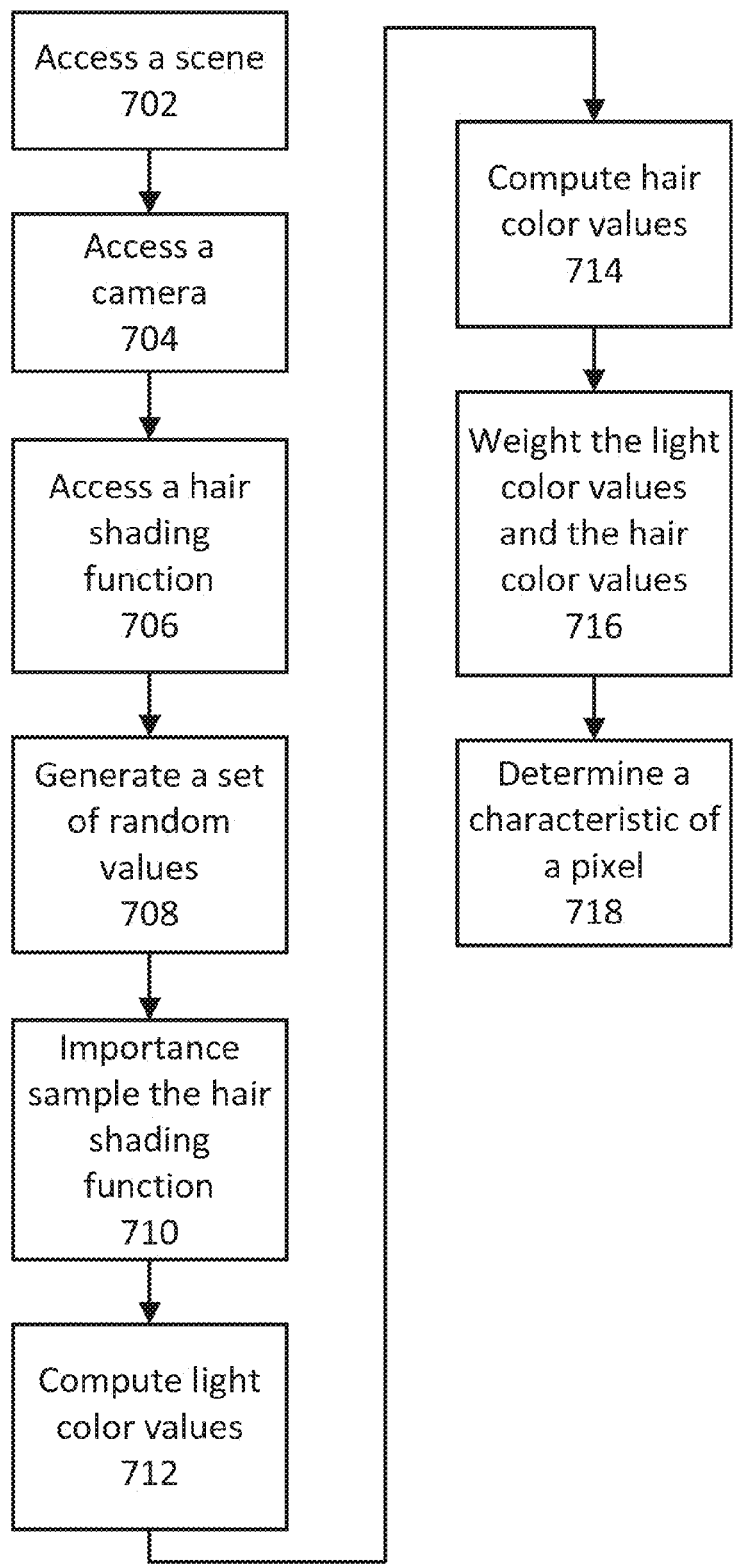
FIG. 7 illustrates one embodiment of importance sampling for hair.

FIG. 7 illustrates one embodiment for importance sampling for hair. At block 702, a computer-generated scene is accessed. The scene comprises at least one virtual light source and at least one virtual object. The light source provides light rays that interact with the objects in the scene. The light source may be, for example, a point light, a spot light, a directional light, an area light, a dome light, and other lights known in the field.

A point light emits light uniformly in all directions from a single point. A spot light emits a cone or beam shaped light field from a single point and in a certain direction. A directional light illuminates every object in the scene from the same angle, regardless of where the object is located relative to the light. An area light simulates the size and shape of a physical light source in the real physical world, such as a rectangle, a circle, or a sphere. As the size of an area light increases, the magnitude of the light emitted from the area light may also increase. A dome light may surround a scene (or a portion of a scene) and provide illumination from all around a scene (or the portion of the scene). For example, a dome light may be used to simulate light from the sky.

One object in the scene represents at least a portion of one or more hairs. The hair may represent a human hair, an animal hair, a synthetic hair, fur, or any other hair-type structure. The hair object may be modeled using numerous techniques. For example, the hair may be comprised of quads, triangles, or various other types of polygons. At least some light from the light source reaches the hair so that it is illuminated. The object has a geometry model and a material model associated with it. The geometry model defines, at least in part, the shape of the object. The material model defines, at least in part, the characteristics of the material of the object. For example, material properties of an object may define the texture of the object, the transparency of the object, or the reflectivity of the object. More specifically, in the case of hair, material properties may define how light reflects, transmits, and scatters as it interacts with the object.

At block 704, a camera is accessed. The camera is a virtual camera that has a position and direction. The camera represents the perspective from which the scene is viewed. When an image of the scene is rendered, it is rendered from the perspective of the camera.

At block 706, a hair shading function is accessed. The hair shading function helps define how the rendered object will appear. Thus, the material property associated with the hair object is defined, at least in part, by the hair shading function. The hair shading function may have one or more specular lobe components. Each specular lobe component of the hair shading function is associated with a width value and an offset value. The width value represents the roughness of the object and the offset value represents a shift of the reflective highlight of the object.

At block 708, a set of random values is generated. At block 710, the hair shading function is importance sampled by converting the set of random values into a set of light direction samples. Each light direction sample in the set of light direction samples has a probability density function that is proportional to the value of the hair shading function at that particular light direction sample. Converting the set of random values into the set of light direction samples is based on a Cauchy distribution, and the probability density function of each converted light direction sample uses a Cauchy distribution.

At block 712, a light color value is computed for each light direction sample in the set of light direction samples. At block 714, a hair color value is computed for each light direction sample. The hair color values are computed using the hair shading function. At block 716, the light color value computed for each light direction sample and the hair color value computed for each light direction sample are weighted using the corresponding probability density function of the light direction samples. These form the set of weighted values. At block 718, a characteristic of a pixel, which represents part of the object within the image as viewed through the camera, is determined. The characteristic of the pixel is based on the set of weighted values.

In general, the blocks of FIG. 7 may be performed in various orders, and in some instances may be performed partially or fully in parallel. Additionally, not all blocks must be performed.

Figure 8:
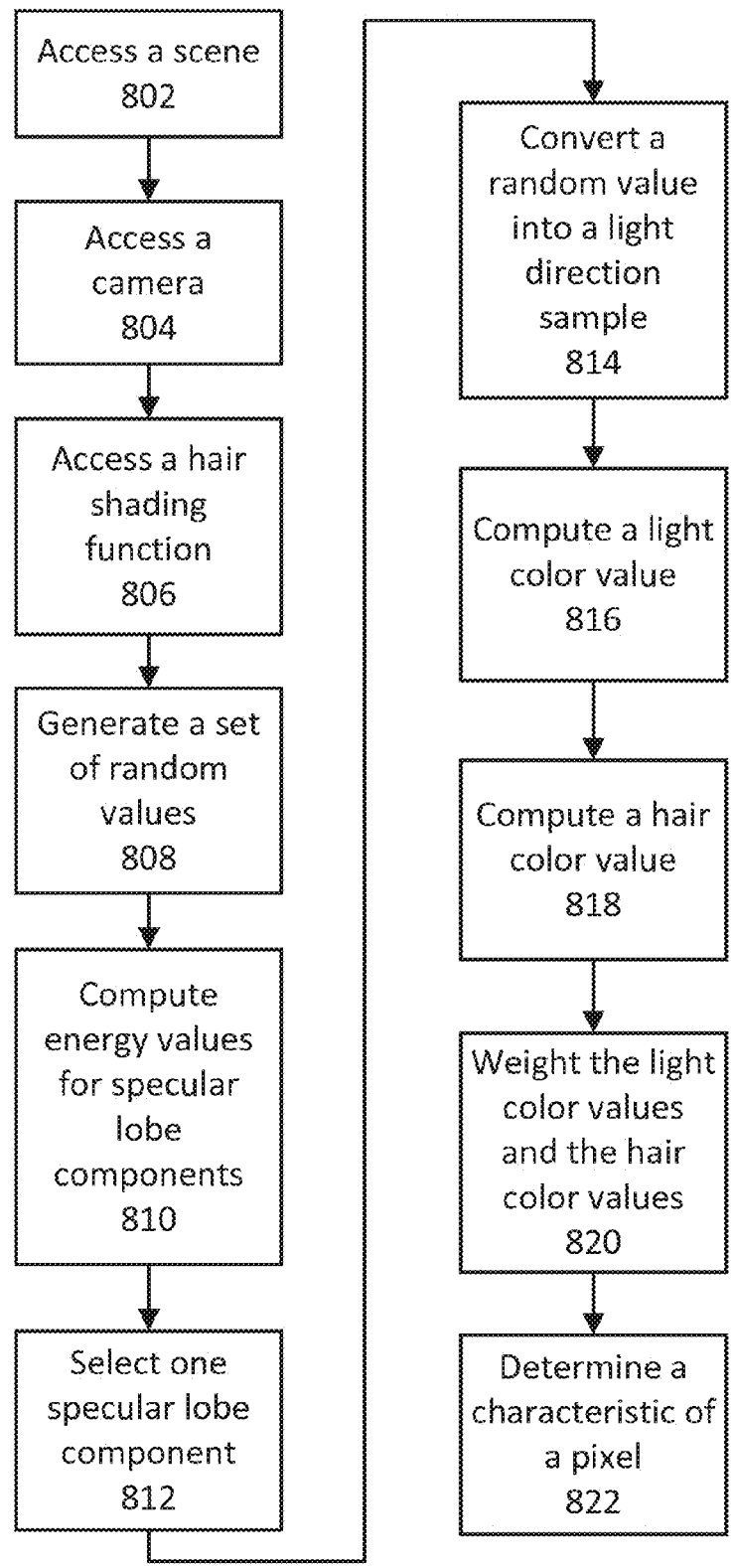
FIG. 8 illustrates another embodiment of importance sampling for hair.

FIG. 8 illustrates another embodiment for importance sampling for hair. At block 802, a computer-generated scene is accessed. The scene comprises at least one virtual light source and at least one virtual object. The light source provides light rays that interact with the objects in the scene. The light source may be, for example, a point light, a spot light, a directional light, an area light, a dome light, and other lights known in the field.

One object in the scene represents at least a portion of one or more hairs. The hair may represent a human hair, an animal hair, a synthetic hair, fur, or any other hair-type structure. The hair object may be modeled using numerous techniques. For example, the hair may be comprised of quads, triangles, or various other types of polygons. At least some light from the light source reaches the hair so that it is illuminated. The object has a geometry model and a material model associated with it. The geometry model defines, at least in part, the shape of the object. The material model defines, at least in part, the characteristics of the material of the object. For example, material properties of an object may define the texture of the object, the transparency of the object, or the reflectivity of the object. More specifically, in the case of hair, material properties may define how light reflects, transmits, and scatters as it interacts with the object.

At block 804, a camera is accessed. The camera is a virtual camera that has a position and direction. The camera represents the perspective from which the scene is viewed. When an image of the scene is rendered, it is rendered from the perspective of the camera.

At block 806, a hair shading function is accessed. The hair shading function helps define how the rendered object will appear. Thus, the material property associated with the hair object is defined, at least in part, by the hair shading function. The hair shading function may have one or more specular lobe components. Each specular lobe component of the hair shading function is associated with a width value and an offset value. The width value represents the roughness of the object and the offset value represents a shift of the reflective highlight of the object.

At block 808, a set of random values is generated. At block 810, an energy value is computed for each of: a primary reflection (R) specular lobe component, a refractive transmission (TT) specular lobe component, a secondary reflection (TRT) specular lobe component, and a glint (G) specular lobe component. At block 812, one specular lobe component is selected from among these specular lobe components based on the energy values. At block 814, a random value from the set of random values is converted into a light direction sample by importance sampling the selected specular lobe component.

Converting the random value into the light direction sample at block 814 may be accomplished by, for example, accessing a longitudinal term of the selected specular lobe component and an azimuthal term of the specular lobe component. A first importance sampling function is determined for the longitudinal term of the one specular lobe component using a Cauchy distribution, and a second importance sampling function is determined for the azimuthal term of the selected lobe component. When the selected specular lobe component is the refractive transmission (TT) specular lobe component or the glint (G) specular lobe component, determining the second importance sampling function for the azimuthal term of the selected specular lobe component also uses a Cauchy distribution.

Further, a first probability density function for the longitudinal term of the light direction sample is calculated using a Cauchy distribution, and a second probability density function for the azimuthal term of the light direction sample is calculated. When the selected one specular lobe component is the refractive transmission (TT) specular lobe component or the glint (G) specular lobe component, calculating the second probability density function for the azimuthal term of the one specular lobe component uses a Cauchy distribution. The probability density function of the light direction sample is calculated by multiplying the first probability density function with the second probability density function.

At block 816, a light color value is computed for the light direction sample. At block 818, a hair color value is computed for the light direction sample. The hair color value is computed using the hair shading function. At block 820, the light color value and the hair color value are weighted using the corresponding probability density function of the light direction sample to form the weighted value. At block 822, a characteristic of a pixel, which represents part of the object within the image as viewed through the camera, is determined. The characteristic of the pixel is based on the weighted value.

In general, the blocks of FIG. 8 may be performed in various orders, and in some instances may be performed partially or fully in parallel. Additionally, not all blocks must be performed.

8. Exemplary Computer System

Figure 9:
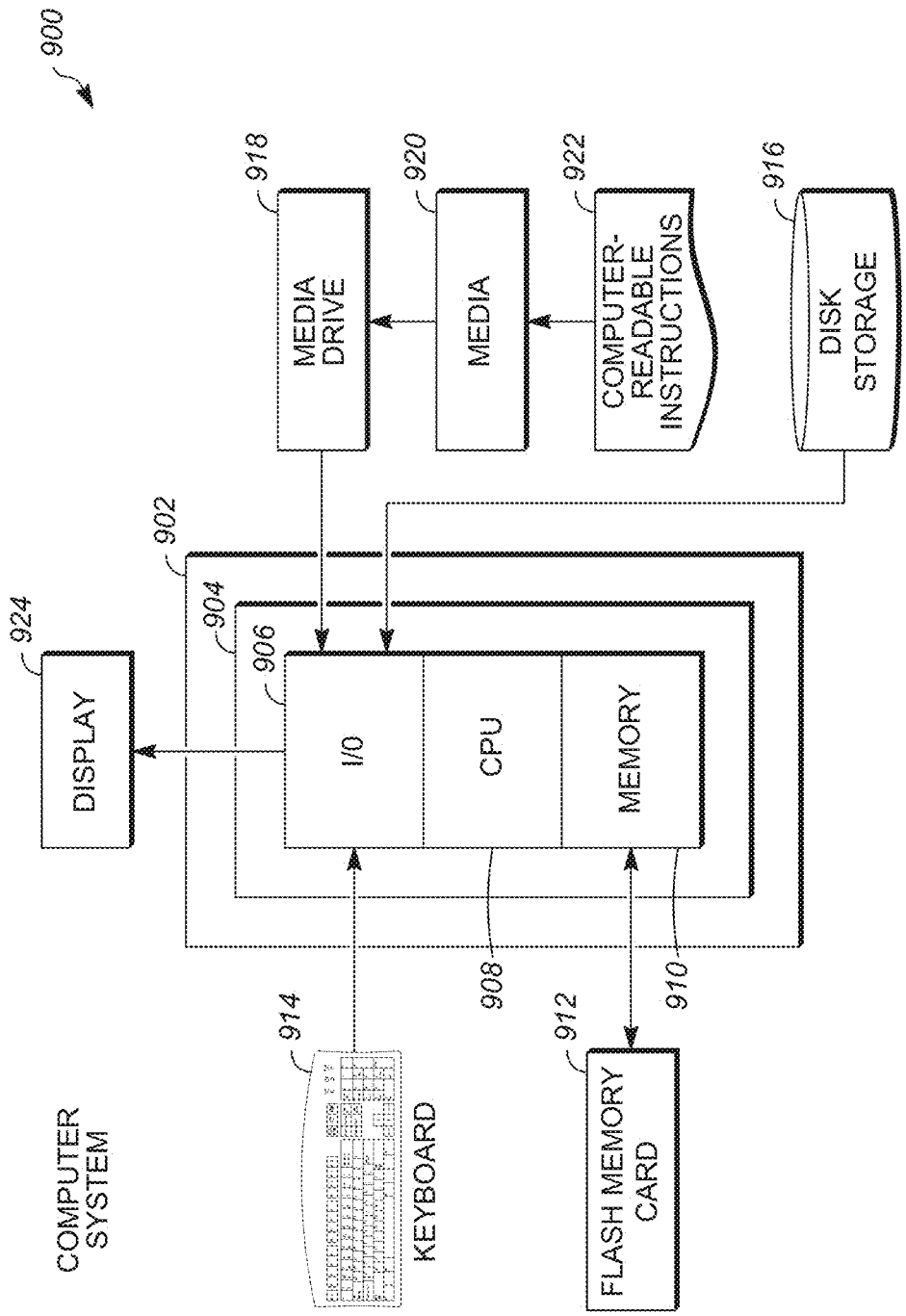
FIG. 9 illustrates an exemplary computing system.

The embodiments described herein are typically implemented in the form of computer software (computer-executable instructions) executed on a computer. FIG. 9 depicts an exemplary computer system 900 configured to perform any one of the above-described processes. In this context, computer system 900 may be a general-purpose computer including, for example, a processor, memory, storage, and input/output devices (e.g., monitor, keyboard, disk drive, Internet connection, etc.). However, computer system 900 may include circuitry or other specialized hardware for carrying out some or all aspects of the processes. In some operational settings, computer system 900 may be configured as a system that includes one or more units, each of which is configured to carry out some aspects of the processes either in software, in hardware, or in some combination thereof. For example, in some embodiments, the process for computing samples in accordance with the processes described above may be computed on parallel computer processors or performed on separate computer systems.

FIG. 9 depicts a computer system 900 with a number of standard components that may be used to perform the above-described processes. The main system 902 includes a motherboard 904 having an input/output ("I/O") section 906, one or more central processing units ("CPU") 908, and a memory section 910, which may have a flash memory card 912 related to it. The I/O section 906 is connected to a display 924, a keyboard 914, a disk storage unit 916, and a media drive unit 918. The media drive unit 918 can read a computer-readable medium 920, which typically contains computer-readable instructions 922 and data.

At least some values based on the results of the above-described processes can be saved for subsequent use. For example, the outputs of the system and the calculated samples can be saved directly in memory 910 (e.g., RAM (Random Access Memory)) or another form of storage, such as disk storage 916. Additionally, values derived from the processes can also be saved directly in memory.

Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

9. Exemplary Pseudo Code

Below, an exemplary embodiment of importance sampling hair is presented in the form of Python pseudo code. For ease of understanding, simple uniform lobe selection is used, rather than energy-based lobe selection. Moreover, this exemplary embodiment is performed without amortizing the cost of constants computation, as described in the Implementation Notes section.

```
# uv - a pair of uniform random variable in [0,1]
# I - viewing direction
# L - light direction
# beta_R, beta_TT, beta_TRT - width of longitudinal gaussian
# alpha_R, alpha_TT, alpha_TRT - offset of longitudinal gaussian
# gamma_G - width of glint
# gamma_TT - width of transmission
# phi_g - offset of glint
pi = 3.1415926
# sample the primary lobe
def sample_R_lobe(uv, I):
    (theta_r, phi_r) = compute_angle(I)
    a_R = arctan(((pi/2 + theta_r)/2 - alpha_R) / beta_R)
    b_R = arctan(((-pi/2 + theta_r)/2 - alpha_R) / beta_R)
    t = beta_R * tan(uv[0] * (a_R - b_R) + b_R)
    theta_h = t + alpha_R
    theta_i = (2 * theta_h - theta_r)
    phi = 2 * arcsin(1 - 2 * uv[2])
    phi_i = phi_r - phi
    phi_pdf = cos(phi/2) / 4
    return compute_direction(theta_i, phi_i)
# sample the transmission lobe
def sample_TT_lobe(uv, I):
    (theta_r, phi_r) = compute_angle(I)
    a_TT = arctan(((pi/2 + theta_r)/2 - alpha_TT) / beta_TT)
    b_TT = arctan(((-pi/2 + theta_r)/2 - alpha_TT) / beta_TT)
    c_TT = 2 * arctan(pi/ 2 / gamma_TT);
    t = beta_TT * tan(uv[0] * (a_TT - b_TT) + b_TT)
    theta_h = t + alpha_TT
    theta_i = (2 * theta_h - theta_r)
    double p = gamma_TT * tan((v - 0.5) * c_TT)
    double phi = p + pi
    double phi_i = phi_r - phi
    return compute_direction(theta_i, phi_i)
# sample the secondary highlight lobe
def sample_TRT_G_lobe(uv, I):
    (theta_r, phi_r) = compute_angle(I)
    a_TRT = arctan(((pi/2 + theta_r)/2 - alpha_TRT) / beta_TRT)
    b_TRT = arctan(((-pi/2 + theta_r)/2 - alpha_TRT) / beta_TRT)
    t = beta_TRT * tan(uv[0] * (a_TRT - b_TRT) + b_TRT)
    theta_h = t + alpha_TRT
    theta_i = (2 * theta_h - theta_r)
```

```
    phi = 2 * arcsin(1 - 2 * uv[2])
    phi_i = phi_r - phi
    phi_pdf = cos(phi/2) / 4
    return compute_direction(theta_i, phi_i)
# sample the glint lobe
def sample_G_lobe(uv, I):
    (theta_r, phi_r) = compute_angle(I)
    a_TRT = arctan(((pi/2 + theta_r)/2 - alpha_TRT) / beta_TRT)
    b_TRT = arctan(((-pi/2 + theta_r)/2 - alpha_TRT) / beta_TRT)
    c_G = atan((pi/2 - phi_g) / gamma_G)
    d_G = atan(-phi_g / gamma_G)
    t = beta_TRT * tan(uv[0] * (a_TRT - b_TRT) + b_TRT)
    theta_h = t + alpha_TRT
    theta_i = (2 * theta_h - theta_r)
    if(uv[1] < 0.5):
        uv[1] = 2 * uv[1]
        sign = 1
    else:
        uv[1] = 2 * (1 - uv[1])
        sign = -1
    p = gamma_G * tan(uv[1] * (c_G - d_G) + d_G)
    phi = sign * (p + phi_g)
    phi_i = phi_r - phi
    return compute_direction(theta_i, phi_i)
# compute the pdf of primary highlight
def compute_R_pdf(L, I):
    (theta_r, phi_r) = compute_angle(I)
    (theta_i, phi_i) = compute_angle(L)
    if(pi/2 - theta_i < epsilon):
        return 0
    a_R = arctan(((pi/2 + theta_r)/2 - alpha_R) / beta_R)
    b_R = arctan(((-pi/2 + theta_r)/2 - alpha_R) / beta_R)
    theta_h = (theta_i + theta_r) / 2
    t = theta_h - alpha_R
    theta_pdf = beta_R / (t*t + beta_R*beta_R) / (2*(a_R - b_R) * cos(theta_i))
    phi = phi_r - phi_i
    phi_pdf = cos(phi/2) / 4
    return theta_pdf * phi_pdf
# compute the pdf of transmission
def compute_TT_pdf(L, I):
    (theta_r, phi_r) = compute_angle(I)
    (theta_i, phi_i) = compute_angle(L)
    if(pi/2 - theta_i < epsilon):
        return 0
    a_TT = arctan(((pi/2 + theta_r)/2 - alpha_TT) / beta_TT)
    b_TT = arctan(((-pi/2 + theta_r)/2 - alpha_TT) / beta_TT)
    c_TT = 2 * arctan(pi/ 2 / gamma_TT);
    theta_h = (theta_i + theta_r) / 2
    t = theta_h - alpha_R
    theta_pdf = beta_R / (t*t + beta_R*beta_R) / (2*(a_R - b_R) * cos(theta_i))
    phi = abs(phi_r - phi_i)
    if phi < pi/2:
        phi_pdf = 0
    else:
        p = pi - phi
        phi_pdf = (gamma_TT / (p * p + gamma_TT * gamma_TT)) / c_TT
    return theta_pdf * phi_pdf
# compute the pdf of secondary highlight without glint
def compute_TRT_G_pdf(L, I):
    (theta_r, phi_r) = compute_angle(I)
    (theta_i, phi_i) = compute_angle(L)
    if(pi/2 - theta_i < epsilon):
        return 0
    a_TRT = arctan(((pi/2 + theta_r)/2 - alpha_TRT) / beta_TRT)
    b_TRT = arctan(((-pi/2 + theta_r)/2 - alpha_TRT) / beta_TRT)
    theta_h = (theta_i + theta_r) / 2
    t = theta_h - alpha_R
    theta_pdf = beta_R / (t*t + beta_R*beta_R) / (2*(a_R - b_R) * cos(theta_i))
    phi = phi_r - phi_i
    phi_pdf = cos(phi/2) / 4
    return theta_pdf * phi_pdf
# compute the pdf of glint term
def compute_G_pdf(L, I):
    (theta_r, phi_r) = compute_angle(I)
    (theta_i, phi_i) = compute_angle(L)
    if(pi/2 - theta_i < epsilon):
        return 0
    a_TRT = arctan(((pi/2 + theta_r)/2 - alpha_TRT) / beta_TRT)
    b_TRT = arctan(((-pi/2 + theta_r)/2 - alpha_TRT) / beta_TRT)
    c_G = arctan((pi/2 - phi_g) / gamma_G)
    d_G = arctan(-phi_g / gamma_G)
    theta_h = (theta_i + theta_r) / 2
    t = theta_h - alpha_R
    theta_pdf = beta_R / (t*t + beta_R*beta_R) / (2*(a_R - b_R) * cos(theta_i))
    phi = abs(phi_r - phi_i)
    p = phi - phi_g
    phi_pdf = gamma_G / (p*p + gamma_G * gamma_G) / (2 * (c_G - d_G))
    return theta_pdf * phi_pdf
def compute_pdf(L, I):
    pdf_R = compute_R_pdf(L, I)
    pdf_TT = compute_TT_pdf(L, I)
    pdf_TRT_G = compute_TRT_G_pdf(L, I)
    pdf_G = compute_G_pdf(L, I)
    return (pdf_R + pdf_TT + pdf_TRT_G + pdf_G) / 4
def sample_brdf(uv, I):
    if uv[0] < 0.5 and uv[1] < 0.5:
        # Sample R lobe
        uv[0] = 2 * uv[0]
        uv[1] = 2 * vv[1]
        L = sample_R_lobe(uv, I)
    elif u >= 0.5 and v < 0.5:
        # Sample TT lobe
        uv[0] = 2 * (1 - uv[0])
        uv[1] = 2 * uv[1]
        L = sample_TT_lobe(uv, I)
    elif u < 0.5 and v >= 0.5:
        # Sample TRT-G lobe
        uv[0] = 2 * uv[0]
        uv[1] = 2 * (1 - uv[1])
        L = sample_TRT_G_lobe(uv, I)
    else:
        # Sample glint lobe
        uv[0] = 2 * (1 - uv[0])
        uv[1] = 2 * (1 - uv[1])
        L = sample_G_lobe(uv, I)
    pdf = compute_pdf(L, I)
    return (L, pdf)
```

Although the invention has been described in considerable detail with reference to certain embodiments thereof, other embodiments are possible, as will be understood to those skilled in the art. Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A computer-implemented method for rendering an image of hair in a computer-generated scene, the method comprising:
    accessing the computer-generated scene, the computer-generated scene comprising at least one virtual light source and at least one virtual object, wherein the virtual object represents at least a portion of one or more hairs and the virtual object comprises a geometry model and a material model, the geometry model defining a shape of the virtual object and the material model defining how light reflects, transmits, and scatters as it intersects the virtual object;

accessing a virtual camera, the virtual camera having a position and a direction through which the computer-generated scene is viewed;

accessing a hair shading function, wherein the material model of the virtual object is defined at least in part by the hair shading function;

wherein the hair shading function comprises at least one specular lobe component, the at least one specular lobe component based on a width value and an offset value, and wherein the width value represents a roughness of the virtual object and the offset value represents a shift of a reflective highlight of the virtual object;

generating a set of random values;

importance sampling the hair shading function by converting the set of random values into a set of light direction samples, each light direction sample of the set of light direction samples having a probability density function that is proportional to the value of the hair shading function at the light direction sample;

wherein converting the set of random values into the set of light direction samples is based on a Cauchy distribution, and the probability density function of each converted light direction sample uses a Cauchy distribution;

computing a light color value for each light direction sample of the set of light direction samples;

computing a hair color value using the hair shading function for each light direction sample of the set of light direction samples;

weighting the light color value and the hair color value computed for each light direction sample to determine a set of weighted values, wherein the weighting uses the corresponding probability density function of each light direction sample;

determining a characteristic of a pixel, wherein the pixel represents part of the virtual object within the image as viewed through the virtual camera; and wherein the characteristic of the pixel is based on the set of weighted values.

2. The method of claim 1, the method further comprising:

computing an energy value for each specular lobe component of a set of specular lobe components of the hair shading function, the set of specular lobe components comprising a primary reflection (R) specular lobe component, a refractive transmission (TT) specular lobe component, a secondary reflection (TRT) specular lobe component, and a glint (G) specular lobe component;

selecting one specular lobe component of the set of specular lobe components, the selection of the one specular lobe component based on the energy values for each specular lobe component of the set of specular lobe components; and converting a random value of the set of random values into a light direction sample by importance sampling the one specular lobe component.

3. The method of claim 2, the method further comprising:

accessing a longitudinal term of the one specular lobe component and an azimuthal term of the one specular lobe component;

determining a first importance sampling function for the longitudinal term of the one specular lobe component using a Cauchy distribution; and determining a second importance sampling function for the azimuthal term of the one specular lobe component.

4. The method of claim 3, wherein when the one specular lobe component is the refractive transmission (TT) specular lobe component or the glint (G) specular lobe component, determining the second importance sampling function for the azimuthal term of the one specular lobe component uses a Cauchy distribution.

5. The method of claim 4, the method further comprising:

calculating a first probability density function for the longitudinal term of the light direction sample using a Cauchy distribution; and calculating a second probability density function for the azimuthal term of the light direction sample.

6. The method of claim 5, the method further comprising:

when the one specular lobe component is the refractive transmission (TT) specular lobe component or the glint (G) specular lobe component, calculating the second probability density function for the azimuthal term of the one specular lobe component uses a Cauchy distribution.

7. The method of claim 6, the method further comprising:

computing the probability density function of the light direction sample by multiplying the first probability density function with the second probability density function.

8. The method of claim 1, the method further comprising:

selecting a lobe component for use in importance sampling the hair shading function; and wherein the lobe component is selected from among a primary lobe component, a transmission lobe component, and a secondary reflection lobe component, the primary lobe component represents reflection of light off an outer surface of the virtual object, the transmission lobe component represents transmission of light through the virtual object, and the secondary reflection lobe component represents reflection of light off an inner surface of the virtual object.

9. The method of claim 8, the method further comprising:

calculating a primary lobe energy approximation value, the primary lobe energy approximation value based on the energy of a primary lobe function;

calculating a transmission lobe energy approximation value, the transmission lobe energy approximation value based on the energy of a transmission lobe function;

calculating a secondary reflection lobe energy approximation value, the secondary reflection lobe energy approximation value based on the energy of a secondary reflection lobe function; and wherein selecting the lobe component for use in importance sampling the hair shading function is based on the primary lobe energy approximation value, the transmission lobe energy approximation value, and the secondary reflection lobe energy approximation value.

10. A non-transitory computer-readable medium comprising computer-executable instructions for use in rendering an image of hair in a computer-generated scene, the computer-executable instructions comprising instructions for:

accessing the computer-generated scene, the computer-generated scene comprising at least one virtual light source and at least one virtual object, wherein the virtual object represents at least a portion of one or more hairs and the virtual object comprises a geometry model and a material model, the geometry model defining a shape of the virtual object and the material model defining how light reflects, transmits, and scatters as it intersects the virtual object;

accessing a virtual camera, the virtual camera having a position and a direction through which the computer-generated scene is viewed;

accessing a hair shading function, wherein the material model of the virtual object is defined at least in part by the hair shading function;

wherein the hair shading function comprises at least one specular lobe component, the at least one specular lobe component based on a width value and an offset value, and wherein the width value represents a roughness of the virtual object and the offset value represents a shift of a reflective highlight of the virtual object;

generating a set of random values;

importance sampling the hair shading function by converting the set of random values into a set of light direction samples, each light direction sample of the set of light direction samples having a probability density function that is proportional to the value of the hair shading function at the light direction sample;

wherein converting the set of random values into the set of light direction samples is based on a Cauchy distribution, and the probability density function of each converted light direction sample uses a Cauchy distribution;

computing a light color value for each light direction sample of the set of light direction samples;

computing a hair color value using the hair shading function for each light direction sample of the set of light direction samples;

weighting the light color value and the hair color value computed for each light direction sample to determine a set of weighted values, wherein the weighting uses the corresponding probability density function of each light direction sample;

determining a characteristic of a pixel, wherein the pixel represents part of the virtual object within the image as viewed through the virtual camera; and wherein the characteristic of the pixel is based on the set of weighted values.

11. The computer-readable storage medium of claim 10, the computer instructions further comprising instructions for:

computing an energy value for each specular lobe component of a set of specular lobe components of the hair shading function, the set of specular lobe components comprising a primary reflection (R) specular lobe component, a refractive transmission (TT) specular lobe component, a secondary reflection (TRT) specular lobe component, and a glint (G) specular lobe component;

selecting one specular lobe component of the set of specular lobe components, the selection of the one specular lobe component based on the energy values for each specular lobe component of the set of specular lobe components; and converting a random value of the set of random values into a light direction sample by importance sampling the one specular lobe component.

12. The computer-readable storage medium of claim 11, the computer instructions further comprising instructions for:

accessing a longitudinal term of the one specular lobe component and an azimuthal term of the one specular lobe component;

determining a first importance sampling function for the longitudinal term of the one specular lobe component using a Cauchy distribution; and determining a second importance sampling function for the azimuthal term of the one specular lobe component.

13. The computer-readable storage medium of claim 12, wherein when the one specular lobe component is the refractive transmission (TT) specular lobe component or the glint (G) specular lobe component, determining the second importance sampling function for the azimuthal term of the one specular lobe component uses a Cauchy distribution.

14. The computer-readable storage medium of claim 13, the computer instructions further comprising instructions for:

calculating a first probability density function for the longitudinal term of the light direction sample using a Cauchy distribution; and calculating a second probability density function for the azimuthal term of the light direction sample.

15. The computer-readable storage medium of claim 14, wherein when the one specular lobe component is the refractive transmission (TT) specular lobe component or the glint (G) specular lobe component, calculating the second probability density function for the azimuthal term of the one specular lobe component uses a Cauchy distribution.

16. The computer-readable storage medium of claim 15, the computer instructions further comprising instructions for:

computing the probability density function of the light direction sample by multiplying the first probability density function with the second probability density function.

17. The computer-readable storage medium of claim 10, the computer instructions further comprising instructions for:

selecting a lobe component for use in importance sampling the hair shading function; and wherein the lobe component is selected from among a primary lobe component, a transmission lobe component, and a secondary reflection lobe component, the primary lobe component represents reflection of light off an outer surface of the virtual object, the transmission lobe component represents transmission of light through the virtual object, and the secondary reflection lobe component represents reflection of light off an inner surface of the virtual object.

18. The computer-readable storage medium of claim 17, the computer instructions further comprising instructions for:

calculating a primary lobe energy approximation value, the primary lobe energy approximation value based on the energy of a primary lobe function;

calculating a transmission lobe energy approximation value, the transmission lobe energy approximation value based on the energy of a transmission lobe function;

calculating a secondary reflection lobe energy approximation value, the secondary reflection lobe energy approximation value based on the energy of a secondary reflection lobe function; and wherein selecting the lobe component for use in importance sampling the hair shading function is based on the primary lobe energy approximation value, the transmission lobe energy approximation value, and the secondary reflection lobe energy approximation value.

19. An apparatus for rendering an image of hair in a computer-generated scene, the apparatus comprising:

a memory configured to store a geometry model and a material model; and one or more processors configured to:

access the computer-generated scene, the computer-generated scene comprising at least one virtual light source and at least one virtual object, wherein the virtual object represents at least a portion of one or more hairs and the virtual object comprises the geometry model and the material model, the geometry model defining a shape of the virtual object and the material model defining how light reflects, transmits, and scatters as it intersects the virtual object;

access a virtual camera, the virtual camera having a position and a direction through which the computer-generated scene is viewed;

access a hair shading function, wherein the material model of the virtual object is defined at least in part by the hair shading function;

wherein the hair shading function comprises at least one specular lobe component, the at least one specular lobe component based on a width value and an offset value, and wherein the width value represents a roughness of the virtual object and the offset value represents a shift of a reflective highlight of the virtual object;

generate a set of random values;

importance sample the hair shading function by converting the set of random values into a set of light direction samples, each light direction sample of the set of light direction samples having a probability density function that is proportional to the value of the hair shading function at the light direction sample;

wherein converting the set of random values into the set of light direction samples is based on a Cauchy distribution, and the probability density function of each converted light direction sample uses a Cauchy distribution;

compute a light color value for each light direction sample of the set of light direction samples;

compute a hair color value using the hair shading function for each light direction sample of the set of light direction samples;

weight the light color value and the hair color value computed for each light direction sample to determine a set of weighted values, wherein the weighting uses the corresponding probability density function of each light direction sample;

determine a characteristic of a pixel, wherein the pixel represents part of the virtual object within the image as viewed through the virtual camera; and wherein the characteristic of the pixel is based on the set of weighted values.

20. The apparatus of claim 19, the one or more processors further configured to:

compute an energy value for each specular lobe component of a set of specular lobe components of the hair shading function, the set of specular lobe components comprising a primary reflection (R) specular lobe component, a refractive transmission (TT) specular lobe component, a secondary reflection (TRT) specular lobe component, and a glint (G) specular lobe component;

select one specular lobe component of the set of specular lobe components, the selection of the one specular lobe component based on the energy values for each specular lobe component of the set of specular lobe components; and convert a random value of the set of random values into a light direction sample by importance sampling the one specular lobe component.

21. The apparatus of claim 20, the one or more processors further configured to:

access a longitudinal term of the one specular lobe component and an azimuthal term of the one specular lobe component;

determine a first importance sampling function for the longitudinal term of the one specular lobe component using a Cauchy distribution; and determine a second importance sampling function for the azimuthal term of the one specular lobe component.

22. The apparatus of claim 21, wherein when the one specular lobe component is the refractive transmission (TT) specular lobe component or the glint (G) specular lobe component, determining the second importance sampling function for the azimuthal term of the one specular lobe component uses a Cauchy distribution.

23. The apparatus of claim 22, the one or more processors further configured to:

calculate a first probability density function for the longitudinal term of the light direction sample using a Cauchy distribution; and calculate a second probability density function for the azimuthal term of the light direction sample.

24. The apparatus of claim 23, wherein when the one specular lobe component is the refractive transmission (TT) specular lobe component or the glint (G) specular lobe component, calculating the second probability density function for the azimuthal term of the one specular lobe component uses a Cauchy distribution.

25. The apparatus of claim 24, the one or more processors further configured to:

compute the probability density function of the light direction sample by multiplying the first probability density function with the second probability density function.

26. The apparatus of claim 19, the one or more processors further configured to:

select a lobe component for use in importance sampling the hair shading function; and wherein the lobe component is selected from among a primary lobe component, a transmission lobe component, and a secondary reflection lobe component, the primary lobe component represents reflection of light off an outer surface of the virtual object, the transmission lobe component represents transmission of light through the virtual object, and the secondary reflection lobe component represents reflection of light off an inner surface of the virtual object.

27. The apparatus of claim 26, the one or more processors further configured to:

calculate a primary lobe energy approximation value, the primary lobe energy approximation value based on the energy of a primary lobe function;

calculate a transmission lobe energy approximation value, the transmission lobe energy approximation value based on the energy of a transmission lobe function;

calculate a secondary reflection lobe energy approximation value, the secondary reflection lobe energy approximation value based on the energy of a secondary reflection lobe function; and wherein selecting the lobe component for use in importance sampling the hair shading function is based on the primary lobe energy approximation value, the transmission lobe energy approximation value, and the secondary reflection lobe energy approximation value.

* * * * *